United States Patent
Koshinaka et al.

(10) Patent No.: US 8,606,574 B2
(45) Date of Patent: Dec. 10, 2013

(54) SPEECH RECOGNITION PROCESSING SYSTEM AND SPEECH RECOGNITION PROCESSING METHOD

(75) Inventors: Takafumi Koshinaka, Tokyo (JP); Masahiko Hamanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 78 days.

(21) Appl. No.: 13/201,816

(22) PCT Filed: Mar. 25, 2010

(86) PCT No.: PCT/JP2010/002126
§ 371 (c)(1),
(2), (4) Date: Aug. 16, 2011

(87) PCT Pub. No.: WO2010/113438
PCT Pub. Date: Oct. 7, 2010

(65) Prior Publication Data
US 2011/0301952 A1    Dec. 8, 2011

(30) Foreign Application Priority Data
Mar. 31, 2009  (JP) .................................. 2009-085532

(51) Int. Cl.
*G10L 15/00* (2013.01)
(52) U.S. Cl.
USPC .......... 704/235; 704/270; 704/270.1; 370/260
(58) Field of Classification Search
USPC ........................ 704/235, 270, 270.1; 370/260
See application file for complete search history.

(56) References Cited

U.S. PATENT DOCUMENTS

| | | | |
|---|---|---|---|
| 6,100,882 A * | 8/2000 | Sharman et al. | 704/235 |
| 6,477,491 B1 * | 11/2002 | Chandler et al. | 704/235 |
| 6,850,609 B1 * | 2/2005 | Schrage | 379/202.01 |
| 7,292,543 B2 * | 11/2007 | Li | 370/260 |
| 7,305,078 B2 * | 12/2007 | Kardos | 379/202.01 |
| 2005/0209848 A1 | 9/2005 | Ishii | |
| 2007/0133437 A1 * | 6/2007 | Wengrovitz et al. | 370/260 |
| 2008/0263010 A1 * | 10/2008 | Roychoudhuri et al. | 707/3 |
| 2008/0316945 A1 | 12/2008 | Endo et al. | |
| 2011/0119059 A1 * | 5/2011 | Ljolje et al. | 704/244 |
| 2012/0191452 A1 * | 7/2012 | Krishnaswamy et al. | 704/235 |

FOREIGN PATENT DOCUMENTS

| | | |
|---|---|---|
| JP | 2003-036096 A | 2/2003 |
| JP | 2003-316375 A | 11/2003 |
| JP | 2005-080110 A | 3/2005 |
| JP | 2005-277462 A | 10/2005 |
| JP | 2006-050500 A | 2/2006 |
| JP | 2006-301223 A | 11/2006 |
| JP | 2009-005064 A | 1/2009 |
| JP | 2009-053342 A | 3/2009 |

* cited by examiner

*Primary Examiner* — Douglas Godbold
*Assistant Examiner* — Ernest Estes
(74) *Attorney, Agent, or Firm* — Sughrue Mion, PLLC

(57) ABSTRACT

The present invention provides a speech recognition processing system in which speech recognition processing is executed parallelly by plural speech recognizing units. Before text data as the speech recognition result is output from each of the speech recognizing units, information indicating each speaker is parallelly displayed on a display in emission order of each speech. When the text data is output from each of the speech recognizing units, the text data is associated with the information indicating each speaker and the text data is displayed.

14 Claims, 11 Drawing Sheets

090301 CONFERENCE

| DATA NO. | GROUP | SPEECH FEATURE DATA | NAME |
|---|---|---|---|
| 0001 | A | 0011 | YAMADA |
| 0002 | A | 0012 | KOBAYASHI |
| : | : | : | : |
| 0010 | B | 0021 | SATO |
| : | : | : | : |

162

SPEECH RECOGNITION PROCESSING SYSTEM AND SPEECH RECOGNITION PROCESSING METHOD

CROSS REFERENCE TO RELATED APPLICATION

This application is a National Stage of International Application No. PCT/JP2010/002126, filed Mar. 25, 2010, claiming priority based on Japanese Patent Application No. 2009-085532, filed Mar. 31, 2009, the contents of all of which are incorporated herein by reference in their entirety.

TECHNICAL FIELD

The present invention relates to a speech recognition processing system and a speech recognition processing method.

BACKGROUND ART

In recent years, it has been studied to use a speech recognition technology in a place such as a conference room where plural speakers exist to easily make conference minutes. When the conference minutes or the like are made using the speech recognition technology, there may be instances in which a user displays text obtained as the result of the speech recognition and fixes a portion that is erroneously recognized while hearing a speech.

Patent Document 1 (Japanese Patent Application Laid-Open No. 2003-316375) describes a distributed dictation system in which a terminal device includes a communication processing unit to transmit a speech recognition processing start instruction and encoded speech data to a host computer and the host computer includes a speech recognition engine to recognize a speech obtained by decoding the input speech data and generate text data and a communication processing unit to return the text data to the terminal device. Thereby, in the distributed dictation system in which the host computer to execute speech recognition processing and plural terminal devices to receive speeches of speakers are distributed, the text resulting from the speech recognition can be easily modified by the terminal device. The same literature also describes that recorded speech data and dictation processed text data are associated with each other using time information as key.

Patent Document 2 (Japanese Patent Application Laid-Open No. 2005-80110) describes a speech conference terminal device that includes a microphone to collect a speech of a speaker and output speech information representing the speech of the speaker, an identifying unit to be provided around the microphone and output identification information based on owner information read from a recording medium in which the owner information for specifying the speaker is recorded, an identification information adding unit to add identification information to the speech information, and a transmitting unit to transmit the speech information to which the identification information is added. In this way, it is possible to provide a speech conference system in which people can participate in a speech conference from one spot, even though plural lines are not used, and each speaker can be easily identified.

Patent Document 3 (Japanese Patent Application Laid-Open No. 2003-036096) describes a speech recognition device that includes a speech input unit to receive a speech, a speech recognizing unit to recognize the contents of the input speech, a state notifying unit to output a state of speech input or speech recognition, and a display unit to display the state, and has the configuration in which the speech input unit and the display unit are disposed such that a user can view the display unit in a state in which the user faces the front of the speech input unit. Thereby, the user can appropriately input the speech while viewing the display unit. Therefore, a speech recognition device that is superior in a recognition rate of the speech is obtained.

RELATED DOCUMENT

Patent Document

PATENT DOCUMENT 1: Japanese Patent Application Laid-Open No. 2003-316375
PATENT DOCUMENT 2: Japanese Patent Application Laid-Open No. 2005-80110
PATENT DOCUMENT 3: Japanese Patent Application Laid-Open No. 2003-036096

DISCLOSURE OF THE INVENTION

Problem to be Solved by the Invention

Meanwhile, it takes some time for the speech recognition engine to execute the speech recognition processing, and thus it is difficult to recognize the speeches of the plural speakers in the conference and output the recognized speeches substantially in real time. For example, according to the technology that is described in Patent Document 1, the plural terminal devices are prepared to receive the speeches. However, the speeches transmitted from these terminal devices are subjected to the speech recognition processing executed by one speech recognition engine. For this reason, this technology is still problematic in terms of the prompt outputting of the speech recognition result.

In order to solve this problem, the inventors are studying parallel processing of the speech recognition with use of a plurality of speech recognition engines. For example, it is considered that the speech recognition engine is provided for each speaker or that plural speakers are grouped into a certain number of groups and the speech recognition engine is provided for each group. In this manner, the speech recognition processing on the speeches of the plural speakers can be expected to be quickly executed in a place where the plural speakers exist.

However, the inventors discovered that a new problem is encountered when parallel processing is executed by the plural speech recognition engines. As described above, some time is needed to execute the speech recognition processing using the speech recognition engine. If the amount of speech data of processing objects increases, time needed to execute the speech recognition processing increases. For this reason, if the amounts of speech data processed by respective speech recognition engines differ, there may be a variation in time taken from the receiving of the speech data as the speech recognition objects to the outputting of the speech recognition result between the speech recognition engines.

This case will be described with reference to FIG. 11. In this example, first, after a relatively long speech "Today's agenda is . . . " is emitted from a speaker A, a relatively short speech "Yes" is emitted from a speaker B. In this case, first, the speech "Today's agenda is . . . " is input to a first speech recognition engine and processed by the first speech recognition engine. Next, the speech "Yes" is input to a second speech recognition engine and processed by the second speech recognition engine.

If the processing capabilities of the first speech recognition engine and the second speech recognition engine are equal, the speech recognition processing that is executed on the relatively short speech "Yes" by the second speech recognition engine ends earlier than the speech recognition processing that is executed on the relatively long speech "Today's agenda is . . . " by the first speech recognition engine, and the speech recognition result is first output from the second speech recognition engine. If the speech recognition results are displayed in real time in ascending order of ending time of the speech recognition processing to be confirmed, the speech recognition results are displayed in the order that is different from the order in which the speeches start to be emitted, as illustrated in the figures. For this reason, it may be difficult for a user who confirms the speech recognition result to read the speech recognition result and confusion may occur. Meanwhile, it is required to display the end result of the speech recognition processing as early as possible to be confirmed. Accordingly, it is an object of the present invention to provide a speech recognition processing system and a speech recognition processing method that resolves the problem according to the related art in which it is difficult for a user to read and grasp the speech recognition results when the user confirms the speech recognition results of the speeches of the plural speakers in real time.

Means for Solving the Problem

According to the present invention, a speech recognition processing system includes a first speech recognizing unit that receives a first speech to be a speech of a first speaker, executes speech recognition processing on the first speech, and outputs the speech recognition result as first text data, a second speech recognizing unit that receives a second speech to be a speech of a second speaker, executes the speech recognition processing on the second speech, and outputs the speech recognition result as second text data, and a display processing unit that associates the first text data and the second text data with information indicating the first speaker and information indicating the second speaker, respectively and displays the association result on a display unit. The display processing unit arranges and displays the information indicating each speaker in order of emission of each speech on the display unit before the first text data and the second text data are output from the first speech recognizing unit and the second speech recognizing unit, respectively, and then associates the first text data and the second text data with the information indicating the speakers, respectively and displays the corresponding text data on the display unit when the first text data and the second text data are output from the first speech recognizing unit and the second speech recognizing unit, respectively.

According to the present invention, a speech recognition processing method includes a first speech recognizing step that receives a first speech to be a speech of a first speaker, executes speech recognition processing on the first speech, and outputs the speech recognition result as first text data, a second speech recognizing step that receives a second speech to be a speech of a second speaker, executes the speech recognition processing on the second speech, and outputs the speech recognition result as second text data, a first display step that arranges and displays information indicating each speaker on a display unit in order of emission of each speech before the first text data and the second text data are output from the first speech recognizing step and the second speech recognizing step, respectively, and a second display step that associates the first text data and the second text data with information indicating the first speaker and information indicating the second speaker, respectively, and displays the asso-ciation result on the display unit when the first text data and the second text data are output from the first speech recognizing step and the second speech recognizing step, respectively.

Any arbitrary combinations of the constituent elements of the above and modified expressions of the present invention between a method, a device, a system, a recording medium, and a computer program are also effective as aspects of the present invention.

Effects of Invention

According to the present invention, the speech recognition results of speeches of plural speakers can be quickly displayed to be easily grasped by a user.

BRIEF DESCRIPTION OF THE DRAWINGS

The above and other objects, features, and advantages of the present invention will become more apparent by preferred embodiments to be described below and the accompanying drawings.

FIG. 8 is a diagram illustrating an example of the internal configuration of a speech feature data storage unit.

DESCRIPTION OF EMBODIMENTS

Figure 1:
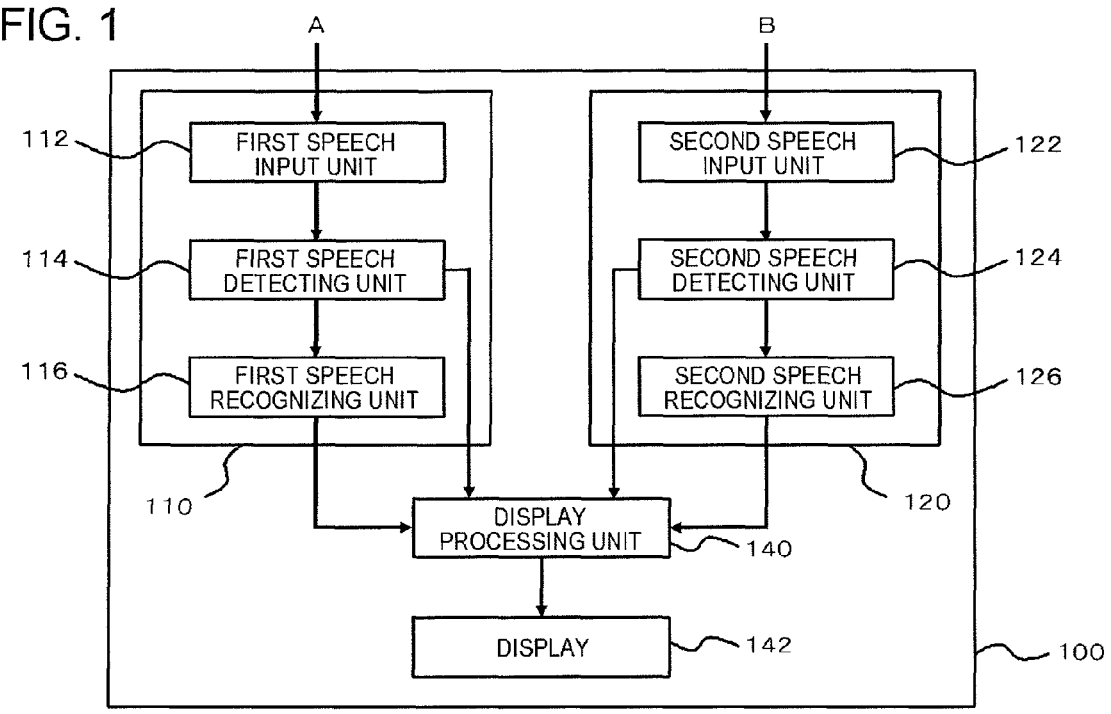
FIG. 1 is a block diagram illustrating an example of the configuration of a speech recognition processing system according to an embodiment of the present invention.

Hereinafter, an embodiment of the present invention will be described using the drawings. In all drawings, like reference numerals refer to like elements and the description thereof will not be redundantly repeated.

First Embodiment

FIG. 1 is a block diagram illustrating an example of the configuration of a speech recognition processing system according to this embodiment.

A speech recognition processing system 100 includes a first speech recognition processing unit 110, a second speech recognition processing unit 120, a display processing unit 140, and a display 142. The first speech recognition processing unit 110 and the second speech recognition processing unit 120 have the same structure, each of which receives a speech, parallelly executes speech recognition processing, and sequentially outputs the end results of the processing.

The first speech recognition processing unit 110 includes a first speech input unit 112 (first speech input means), a first speech detecting unit 114 (first speech detecting means), and a first speech recognizing unit 116 (first speech recognizing means). The second speech recognition processing unit 120 is the same configuration as that of the first speech recognition processing unit 110 and includes a second speech input unit 122 (second speech input means), a second speech detecting unit 124 (second speech detecting means), and a second speech recognizing unit 126 (second speech recognizing means).

Each of the first speech input unit 112 and the second speech input unit 122 can be configured by a microphone. In this embodiment, the first speech input unit 112 or the second speech input unit 122 is disposed in a conference room and receives speeches made by participants in a conference. Each of the first speech input unit 112 and the second speech input unit 122 can be configured to be disposed near a specific speaker and mainly receives a speech of a specific speaker. In this embodiment, a speech (first speech) of a speaker "A" is mainly input to the first speech input unit 112 and a speech (second speech) of a speaker "B" is mainly input to the second speech input unit 122.

The first speech detecting unit 114 executes known acoustic analysis processing on the speech input through the first speech input unit 112, detects a start point and an end point of a speech on the basis of spectral power or a signal/noise ratio (SNR), and generates speech data with one speech as a unit. The first speech detecting unit 114 sets detection time of the speech to emission time of the speech and associates time information (first time information) indicating the detection time of the speech and information indicating a speaker of the speech with speech data. Although not illustrated in the drawings, the speech recognition processing system 100 has a clock means (clock circuit or the like) that clocks current time and the first speech detecting unit 114 acquires time information from the clock means. The first speech detecting unit 114 outputs the speech data where the time information and the information indicating the speaker are associated with each other, to the first speech recognizing unit 116.

The first speech recognizing unit 116 executes speech recognition processing on the speech data output from the first speech detecting unit 114 and generates text data. The first speech recognizing unit 116 outputs the generated text data to the display processing unit 140.

The second speech detecting unit 124 and the second speech recognizing unit 126 of the second speech recognition processing unit 120 have the same configuration as the first speech detecting unit 114 and the first speech recognizing unit 116 of the first speech recognition processing unit 110, and execute the same processing. That is, the second speech detecting unit 124 associates speech data of a speech input through the second speech input unit 122 with time information indicating detection time of the speech and information indicating a speaker of the speech, and outputs the association result to the second speech recognizing unit 126. The second speech recognizing unit 126 executes speech recognition processing on the speech data that is output from the second speech detecting unit 124, generates text data, and outputs the text data to the display processing unit 140. Each of the first speech recognizing unit 116 and the second speech recognizing unit 126 may be configured to have the same function as a common speech recognition engine. In this embodiment, the first speech recognizing unit 116 and the second speech recognizing unit 126 may be configured to have the same processing capability.

In this embodiment, the speech that is input from the first speech input unit 112 can be previously set as the speech of the speaker "A" and the speech that is input from the second speech input unit 122 can be previously set as the speech of the speaker "B". The first speech detecting unit 114 determines that the speaker of the speech input from the first speech input unit 112 is the speaker "A" and outputs the speaker "A" as information indicating the speaker of the input speech. Likewise, the second speech detecting unit 124 determines that the speaker of the speech input from the second speech input unit 122 is the speaker "B" and outputs the speaker "B" as information indicating the speaker of the input speech.

The display processing unit 140 executes processing for sequentially displaying the text data output from the first speech recognizing unit 116 and the second speech recognizing unit 126, on the display 142. Specifically, the display processing unit 140 parallelly displays the information indicating the speakers of the speeches and the text data to be the speech recognition results on the display 142 in emission order of the speeches.

Figure 11:
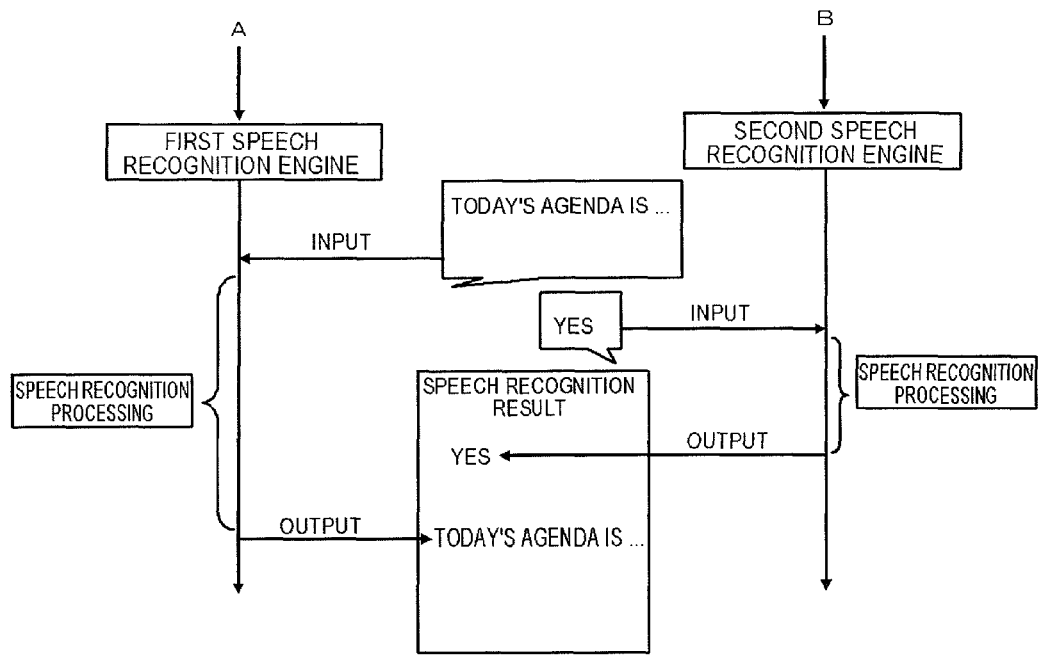
FIG. 11 is a diagram illustrating a new problem that occurs when parallel processing is executed by plural speech recognition engines.

Meanwhile, when the speech recognition processing is executed parallelly by the first speech recognition processing unit 110 and the second speech recognition processing unit 120, if time is needed to execute any speech recognition processing, output time of the speech recognition result may be reversed. In this case, as described with reference to FIG. 11, the speech recognition results may be displayed in order different from actual emission order of the speeches, it may be difficult for a user to confirm the speech recognition results, and confusion may be caused.

For this reason, in this embodiment, before the text data that is the speech recognition result from the first speech recognizing unit 116 and the text data that is the speech recognition result from the second speech recognizing unit 126 are output, the display processing unit 140 parallelly displays information indicating the first speaker and information indicating the second speaker on the display 142 in emission order of the speeches. Next, if the text data is output from each of the first speech recognizing unit 116 and the second speech recognizing unit 126, the display processing unit 140 displays the text data, the corresponding speech recognition results, in a state of being associated with the information indicating the corresponding speakers, respectively on the display 142.

Specifically, if the speech is input, the first speech detecting unit 114 outputs the time information indicating detection time of the speech and the information indicating the speaker to the display processing unit 140, before the text data is output from the first speech recognizing unit 116. For example, the first speech detecting unit 114 can output the time information and the information indicating the speaker to the display processing unit 140 at the same time as outputting the speech data associated with the time information and the information indicating the speaker to the first speech recognizing unit 116.

Likewise, if the speech is input, the second speech detecting unit 124 outputs the time information indicating detection time of the speech and the information indicating the speaker to the display processing unit 140, before the speech recognizing process is executed by the second speech recognizing unit 126. For example, the second speech detecting unit 124 can output the time information and the information indicating the speaker to the display processing unit 140 at the same time as outputting the speech data associated with the time information and the information indicating the speaker to the second speech recognizing unit 126.

Figure 2:
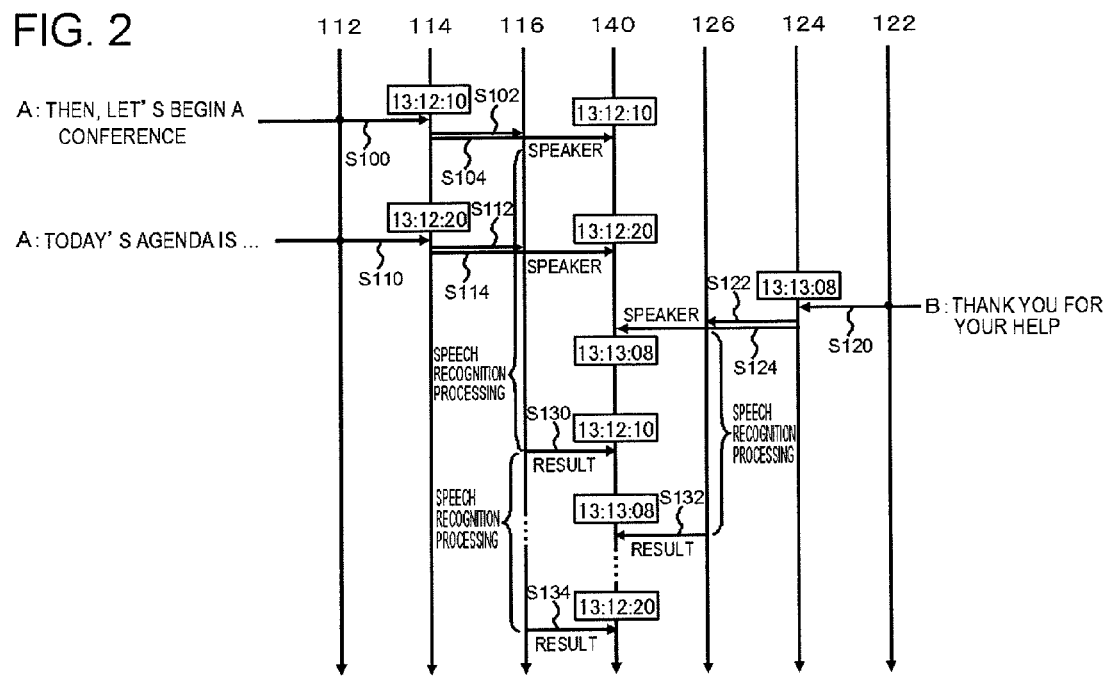
FIG. 2 is a flowchart illustrating processing timings in the speech recognition processing system according to the embodiment of the present invention.
Figure 3:
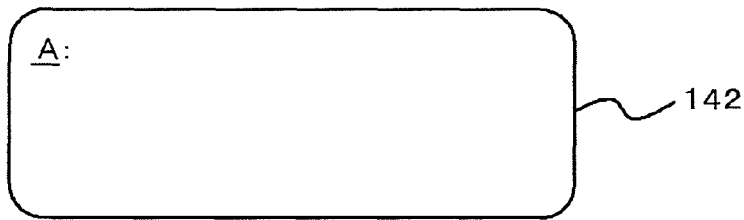
FIG. 3 is a diagram illustrating an example of a screen that is displayed on a display.
Figure 3:
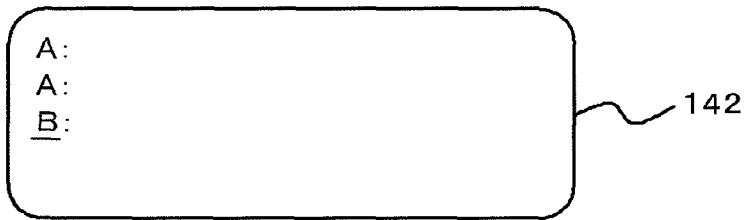
Figure 3:
Figure 3:
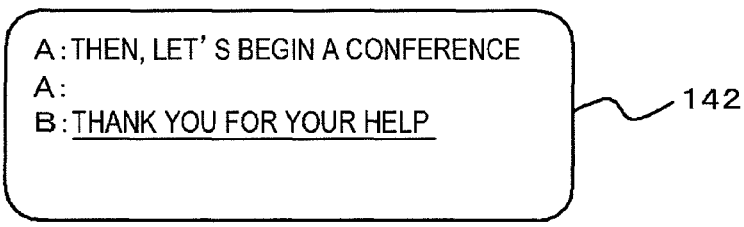
Figure 3:
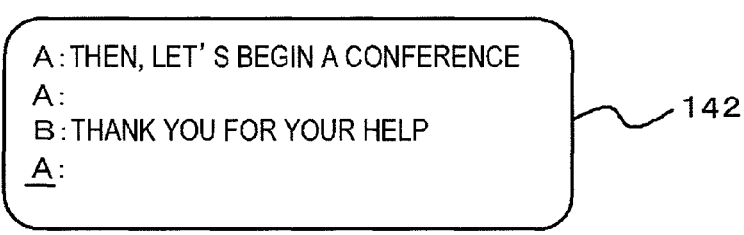
Figure 3:
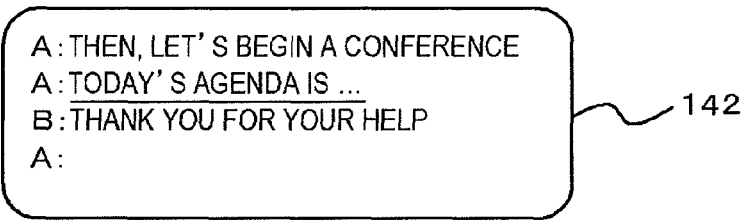

Next, the detailed processing sequence will be described with reference to FIGS. 2 and 3. FIG. 2 is a flowchart illustrating processing timing of the speech recognition processing system 100. FIG. 3 is a diagram illustrating an example of a screen that is displayed on the display 142.

For example, the speaker A speaks "Then, let's begin a conference" and then speaks "Today's agenda is . . . ". Next, the speaker B speaks "Thank you for your help".

First, the speech "Then, let's begin a conference" of the speaker A is input to the speech detecting unit 114 through the first speech input unit 112 (Step S100). In this case, time that is detected by the first speech detecting unit 114 is 13:12:10 ("13:12:10"). The first speech detecting unit 114 generates speech data, associates the time information "13:12:10" indicating the detection time of the speech and the information "A" indicating the speaker A with the speech data, and outputs the association result to the first speech recognizing unit 116 (Step S102).

The first speech recognizing unit 116 sequentially executes speech recognition processing on the speech data that is input from the first speech detecting unit 114. In a case where speech recognition processing on the speech data, which is input before new speech data, has been completed, the first speech recognizing unit 116 starts speech recognition processing on the newly input speech data. Meanwhile, in a case where the speech recognition processing on the speech data, which is input before new speech data, has not been completed, the first speech recognizing unit 116 starts speech recognition processing on the newly input speech data, after waiting completion of the speech recognition processing on the previous speech data.

At almost the same time as the process of Step S102, the first speech detecting unit 114 outputs the time information "13:12:10" indicating the detection time of the speech and the information "A" indicating the speaker A to the display processing unit 140 (Step S104). The display processing unit 140 displays the information "A" indicating the speaker A on the display 142 (refer to FIG. 3(a)).

Next, the speech "Today's agenda is . . . " of the speaker A is input to the speech detecting unit 114 through the first speech input unit 112 (Step S110). In this case, time that is detected by the first speech detecting unit 114 is 13:12:20 ("13:12:20"). The first speech detecting unit 114 generates speech data, associates the time information "13:12:20" indicating the detection time of the speech and the information "A" indicating the speaker A with the speech data, and outputs the association result to the first speech recognizing unit 116 (Step S112).

At almost the same time as the process of step S112, the first speech detecting unit 114 outputs the time information "13:12:20" indicating the detection time of the speech and the information "A" indicating the speaker A to the display processing unit 140 (Step S114). The display processing unit 140 displays the information "A" indicating the speaker A on the display 142.

Next, the speech "Thank you for your help" of the speaker B is input to the second speech detecting unit 124 through the second speech input unit 122 (Step S120). In this case, time that is detected by the second speech detecting unit 124 is 13:13:08 ("13:13:08"). The second speech detecting unit 124 generates speech data, associates the time information "13:13:08" indicating the detection time of the speech and the information "B" indicating the speaker B with the speech data, and outputs the association result to the second speech recognizing unit 126 (Step S122).

The second speech recognizing unit 126 sequentially executes speech recognition processing on the speech data that is input from the second speech detecting unit 124. In a case where speech recognition processing on the speech data, which is input before new speech data, has been completed, the second speech recognizing unit 126 starts speech recognition processing on the newly input speech data. Meanwhile, in a case where speech recognition processing on the speech data, which is input before new speech data, has not been completed, the second speech recognizing unit 126 starts speech recognition processing on the newly input speech data, after waiting the completion of speech recognition processing on the previous speech data.

At almost the same time as the process of Step S122, the second speech detecting unit 124 outputs the time information "13:13:08" indicating the detection time of the speech and the information "B" indicating the speaker B to the display processing unit 140 (Step S124). The display processing unit 140 displays the information "B" indicating the speaker B on the display 142 (refer to FIG. 3(b)). The display processing unit 140 displays the information indicating each speaker on the display 142 in temporal order, on the basis of the time information associated with the information indicating each speaker.

By this display, the user who views the display 142 can grasp that the speaker B makes a speech after the speaker A makes a speech two times. The user who is viewing the display 142 can grasp the speaker whose speech is recognized in advance.

In FIG. 3, in order to simplify the description, portions that are newly displayed on the display 142 are underlined. In an actual screen of the display 142, underlining may be applied. Alternatively, highlighted display may be applied or a cursor (flashing bar) may be displayed. Thereby, the user who views the display 142 can easily grasp a newly displayed portion.

Next, if speech recognition processing on the speech "Then, let's begin a conference" is completed in the first speech recognizing unit 116, the first speech recognizing unit 116 outputs the text data as the processing result, the time "13:12:10", and the speaker "A" to the display processing unit 140 (Step S130). The display processing unit 140 displays the text "Then, let's begin a conference" that is the authentication result at a location corresponding to "A" of the display 142 (refer to FIG. 3(c)). For this instance, the display processing unit 140 can execute processing of displaying "Then, let's begin a conference" as the authentication result at the location corresponding to "A", using the time information associated with the text data that is the speech recognition result and time information associated with the previously output information indicating the speaker as a key. For this reason, in Step S130, the first speech recognizing unit 116 may associate the text data with only the time information indicating the time "13:12:10" and output the association result to the display processing unit 140.

Next, if speech recognition processing on the speech "Thank you for your help" is completed in the second speech recognizing unit 126, the second speech recognizing unit 126 outputs the text data as the processing result, the time "13:13:08", and the speaker "B" to the display processing unit 140 (Step S132). The display processing unit 140 displays "Thank you for your help" as the authentication result at a location corresponding to "B" of the display 142 (refer to FIG. 3(d)).

When the first speech detecting unit 114 detects a new speech before the first speech recognizing unit 116 ends the speech recognition processing on the speech "Today's agenda is . . . ", the same processes as Steps S102 and S104 and steps S112 and S114 are executed and the display processing unit 140 displays the information "A" indicating the speaker A on the display 142 (refer to FIG. 3(e)).

Next, if speech recognition processing on the speech "Today's agenda is . . . " ends in the first speech recognizing unit 116, the first speech recognizing unit 116 outputs the text data as the processing result, the time "13:12:20", and the speaker "A" to the display processing unit 140 (Step S134). The display processing unit 140 displays "Today's agenda is . . . " that is the authentication result at the location corresponding to "A" of the display 142 (refer to FIG. 3(f)).

Figure 4:
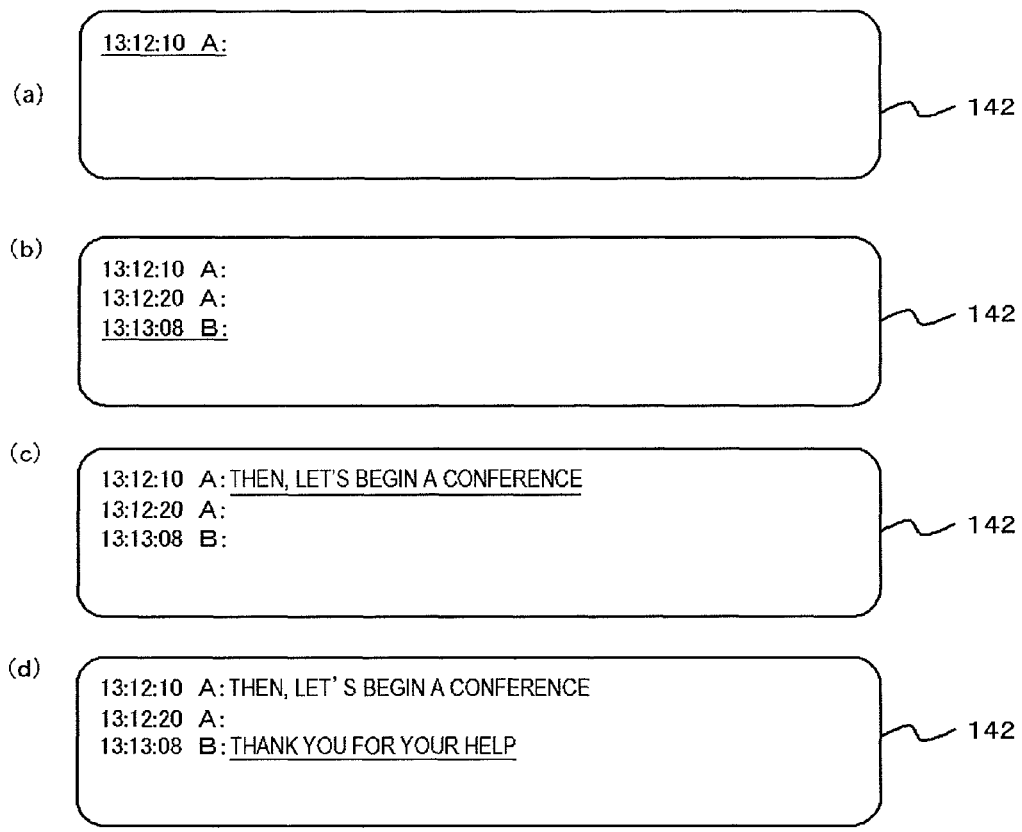
FIG. 4 is a diagram illustrating another example of the screen that is displayed on the display.

In FIG. 3, the example in which the time is not displayed on the display 142 is illustrated. However, as illustrated in FIG. 4, the time can be displayed on the display 142. FIGS. 4(a) to 4(d) illustrate like states as those illustrated in FIGS. 3(a) to 3(d).

According to the speech recognition processing system 100 in this embodiment, the first speech recognizing unit 116 and the second speech recognizing unit 126 that are the plural speech recognition engines are provided and parallelly execute the speech recognition processing. Therefore, the speech recognition processing on the speeches of the plural speakers can be quickly executed in the conference. Here, if the time is needed to execute the speech recognition processing by any one of the first speech recognizing unit 116 and the second speech recognizing unit 126, output order of the speech recognition results may be reversed to actual emission order of the speeches. For this instance, as described with reference to FIG. 11, the speech recognition results may be displayed in the order different from the actual emission order of the speeches, so that it may be difficult for a user to confirm the speech recognition results, and confusion may be caused.

However, according to the speech recognition processing system 100 in this embodiment, before the speech recognition results are output, items of the information indicating the speakers of speeches are arranged in emission order of the respective speeches, and displayed on the display 142 in such order. For this reason, even when the output order of the speech recognition results is reversed to the actual emission order of the speeches, the end result of the speech recognition processing can be displayed as early as possible, while the emission order of the speeches from each speaker is displayed. Thereby, the speech recognition results can be displayed such that the user who confirms the speech recognition results easily views the speech recognition results without confusion.

Second Embodiment

Figure 5:
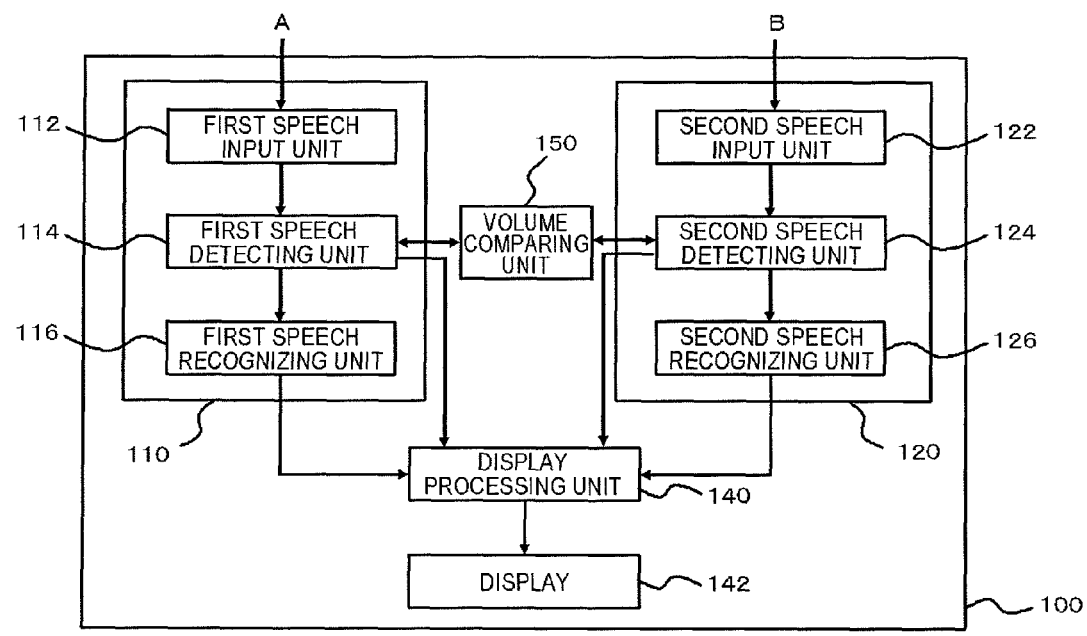
FIG. 5 is a block diagram illustrating another example of the configuration of the speech recognition processing system according to the embodiment of the present invention.

FIG. 5 is a block diagram illustrating an example of the configuration of a speech recognition processing system according to this embodiment.

In this embodiment, the speech recognition processing system 100 has the same configuration as that of the first embodiment described with reference to FIG. 1. In this embodiment, the speech recognition processing system 100 is different from the speech recognition processing system according to the first embodiment in that the speech recognition processing system 100 of this embodiment further includes a volume comparing unit 150 as compared with the configuration of the speech recognition processing system 100 illustrated in FIG. 1.

In this embodiment, a speech (first speech) of a speaker "A" is mainly input to a first speech input unit 112 and a speech (second speech) of a speaker "B" is mainly input to a second speech input unit 122. However, if the first speech input unit 112 and the second speech input unit 122 collect sounds in a wide area or the speakers stay close to each other, there may an instance in which the speech of the speaker B is likely to be input to the first speech input unit 112 and the speech of the speaker A is likely to be input to the second speech input unit 122. For this reason, the speech recognition processing on the same speech may be executed redundantly by both the first speech recognizing unit 116 and the second speech recognizing unit 126 and as a result the speaker may be incorrectly specified.

Therefore, in this embodiment, the volume comparing unit 150 compares the volumes of the speeches detected by the first speech detecting unit 114 and the second speech detecting unit 124, respectively at the same time, and executes processing of determining that the speech having a higher volume is a regular input. That is, the volume comparing unit 150 compares the volumes of the speeches that are simultaneously output from the first speech input unit 112 and the second speech input unit 122. When the volume of the speech output from the first speech input unit 112 is higher than the volume of the speech output from the second speech input unit 122, the speech comparing unit 150 determines that the speech is the speech of the speaker "A". When the volume of the speech output from the second speech input unit 122 is higher than the volume of the speech output from the first speech input unit 112, the speech comparing unit 150 determines that the speech is the speech of the speaker "B".

Figure 6:
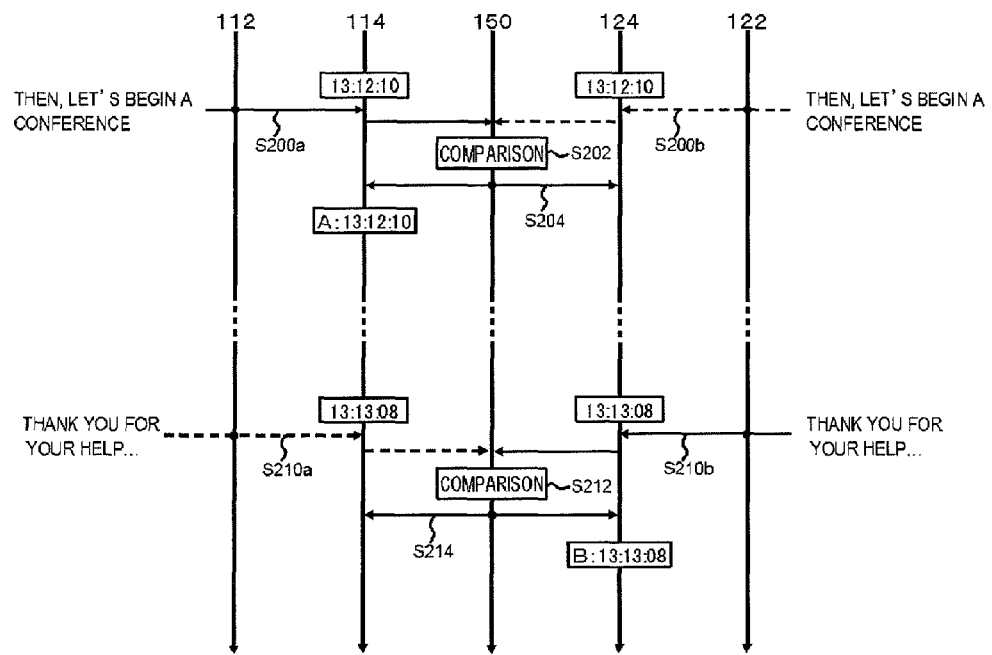
FIG. 6 is a flowchart illustrating processing timings in the speech recognition processing system illustrated in FIG. 5.

Referring to FIG. 6, the details of the processing sequence will be described. FIG. 6 is a flowchart illustrating processing timing of the speech recognition processing system 100.

Similar to the first embodiment, in the second embodiment, the speaker A speaks "Then, let's begin a conference" and then speaks "Today's agenda is . . . ". Next, the speaker B speaks "Thank you for your help".

First, the speech "Then, let's begin a conference" of the speaker A is input to the speech detecting unit 114 through the first speech input unit 112 (Step S200a). At the same time, this speech is also input to the second speech detecting unit 124 through the second speech input unit 122 (Step S200b). The first speech detecting unit 114 and the second speech detecting unit 124 generate speech data of the speech and associate input times.

Next, the volume comparing unit 150 compares the volumes of the speech data that are generated by the first speech detecting unit 114 and the second speech detecting unit 124 (Step S202). In this case, since the speech is the speech of the speaker A, the volume of the speech data that is generated by the first speech detecting unit 114 becomes higher than the volume of the speech data that is generated by the second speech detecting unit 124. For this reason, the volume comparing unit 150 determines that the speech data is speech data to be processed by the first speech recognition processing unit 110 and notifies the first speech detecting unit 114 and the second speech detecting unit 124 of the determination result (step S204). Thereby, the first speech detecting unit 114 executes processes to execute the speech recognition processing and the display processing similar to those of the first embodiment. Meanwhile, the second speech detecting unit 124 does not execute the following processes and waits for the input of a next speech.

On the speech "Today's agenda is . . . " of the speaker A, the same processes are executed. Next, the speech "Thank you for your help" of the speaker B is input to the first speech detecting unit 114 through the first speech input unit 112 (Step S210a). At the same time, this speech is also input to the second speech detecting unit 124 through the second speech input unit 122 (Step S210b). The first speech detecting unit 114 and the second speech detecting unit 124 generate speech data of the speech and associate input times.

Next, the volume comparing unit 150 compares the volumes of the speech data that are generated by the first speech detecting unit 114 and the second speech detecting unit 124 (Step S212). In this case, since the speech is the speech of the speaker B, the volume of the speech data that is generated by the second speech detecting unit 124 becomes higher than the volume of the speech data that is generated by the first speech detecting unit 114. For this reason, the volume comparing unit 150 determines that the speech data is speech data to be processed by the second speech recognition processing unit 120 and notifies the first speech detecting unit 114 and the second speech detecting unit 124 of the determination result (Step S214). Thereby, the second speech detecting unit 124 executes processes to execute the speech recognition processing and display processing similar to those of the first embodiment. Meanwhile, the first speech detecting unit 114 does not execute the following processes and waits for input of a next speech.

In this embodiment, the same effect as the first embodiment can be obtained. Even when the speech to be originally scheduled to be processed by the first speech recognition processing unit 110 is input to the second speech input unit 122 of the second speech recognition processing unit 120 or when the speech to be originally scheduled to be processed by the second speech recognition processing unit 120 is input to the first speech input unit 112 of the first speech recognition processing unit 110, it is possible to prevent that the inputs are determined as being the regular inputs and thus the speech recognition processing on the same speech is executed redundantly by both the first speech recognizing unit 116 and the second speech recognizing unit 126 and the speaker is incorrectly specified.

Third Embodiment

Figure 7:
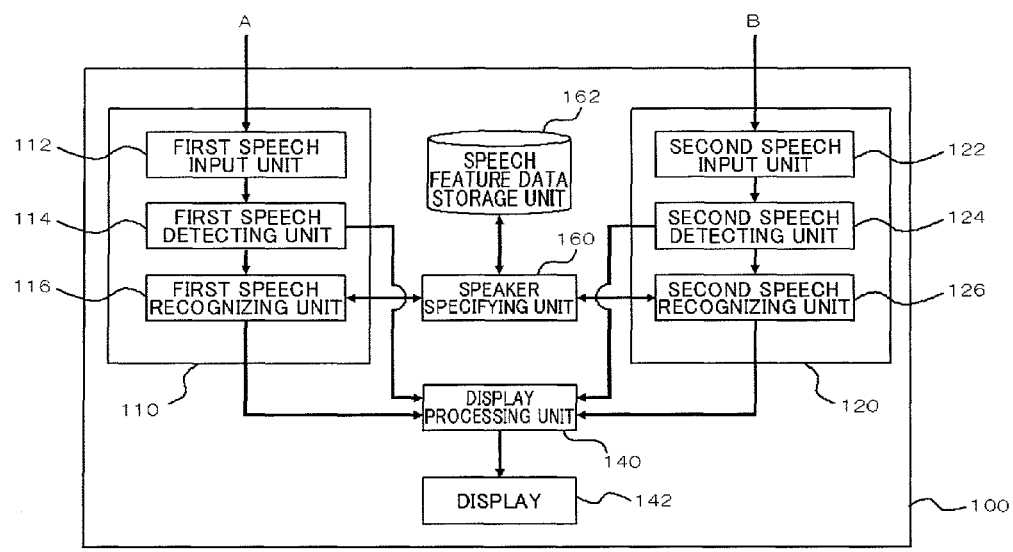
FIG. 7 is a block diagram illustrating another example of the configuration of the speech recognition processing system according to the embodiment of the present invention.

FIG. 7 is a block diagram illustrating an example of the configuration of a speech recognition processing system according to this embodiment.

In this embodiment, the speech recognition processing system 100 has the same configuration as that of the first embodiment described with reference to FIG. 1. In this embodiment, the speech recognition processing system 100 is different from the speech recognition processing system according to the first embodiment in that the speech recognition processing system 100 of this embodiment further includes a speaker specifying unit 160 and a speech feature data storage unit 162 as compared with the configuration of the speech recognition processing system 100 illustrated in FIG. 1.

In this embodiment, plural speakers can be grouped and the first speech input unit 112 and the second speech input unit 122 can be provided for each group. For example, in a conference between an A company and a B company, the first speech input unit 112 may be provided for the A company and the second speech input unit 122 may be provided for the B company.

In this case, at a time point when the speech is input to the first speech detecting unit 114 or the second speech detecting unit 124, only the group of each speech can be grasped but it is not grasped who in the group has made the speech. However, if feature data of a speech of each participant is previously stored, each speaker can be specified through comparison between the speech and the feature data.

The speech feature data storage unit 162 stores the feature data of the speeches of the participants of a conference who are recognition processing objects. In this case, the speech feature data is arbitrary data that indicates a feature of each speaker. For example, the speech feature data may be a mel-cepstrum coefficient (MFCC) that is widely used in the speech recognition system or numerical data that is recorded in the format in which the mel-cepstrum coefficient is converted with a mathematical model. As the mathematical model, it is general to use a Gaussian mixture model (GMM). FIG. 8 is a diagram illustrating an example of the internal configuration of the speech feature data storage unit 162. The speech feature data storage unit 162 has the configuration in which a data number field, a group field, a speech feature data field, and a name field are associated with each other.

Returning to FIG. 7, the speaker specifying unit 160 compares the speech data processed by the first speech recognizing unit 116 and the second speech recognizing unit 126 with the speech feature data stored in the speech feature data storage unit 162 and specifies the speaker of each speech data. Specifically, the speaker specifying unit 160 detects the speech feature data that is matched with the speech feature of the speech data processed by the first speech recognizing unit 116 and the second speech recognizing unit 126, associates a "name" of the speaker corresponding to the speech feature data as information indicating the speaker with the text data of the speech recognition results output by the first speech recognizing unit 116 and the second speech recognizing unit 126, and outputs the association result to the display processing unit 140.

Figure 9:
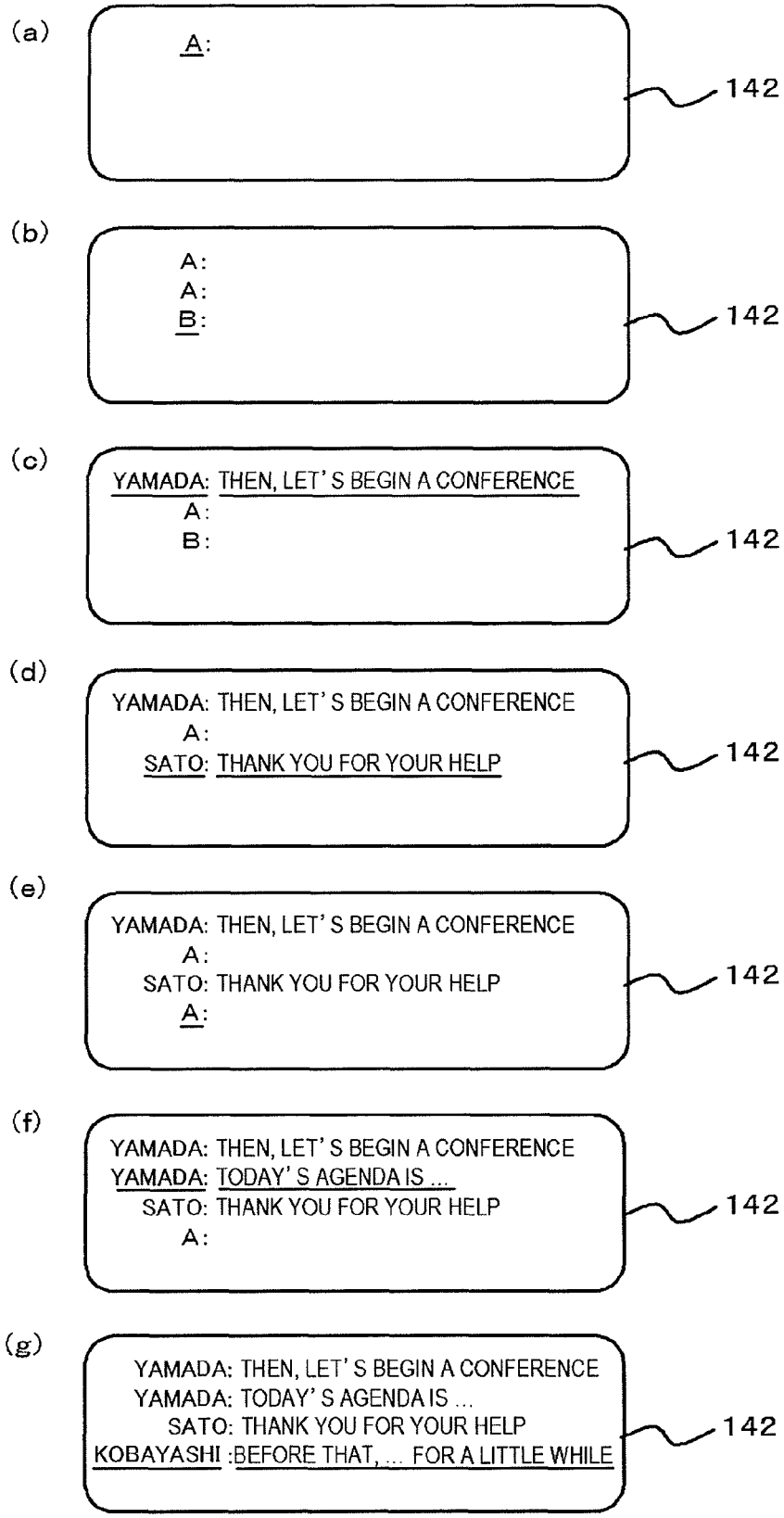
FIG. 9 is a diagram illustrating an example of a screen that is displayed on a display of the speech recognition processing system illustrated in FIG. 7.

Next, a processing sequence of the speech recognition processing system 100 according to this embodiment will be described. FIG. 9 is a diagram illustrating an example of a screen that is displayed on the display 142 according to this embodiment.

In this embodiment, a sequence that the display processing unit 140 displays the information indicating each speaker on the display 142 in temporal order on the basis of the time information associated with the information indicating each speaker is the same as the sequence in the first embodiment (refer to FIGS. 9(a) and 9(b)). For this reason, information indicating the groups such as "A" and "B" is displayed as the information indicating the speaker, until the speech recognition results are displayed on the display 142.

Meanwhile, in this embodiment, when the first speech recognizing unit 116 and the second speech recognizing unit 126 output the text data as the speech recognition results to the display processing unit 140, the name of the speaker of each text data is also output. For this reason, the display processing unit 140 changes the information indicating the groups such as "A" and "B" with the name of the speaker of each speech and displays the name, at the same time as displaying the speech recognition results on the display 142.

For example, the speaker specifying unit 160 determines that a feature of the speech "Then, let's begin a conference" is matched with speech feature data "0011" having data NO. "0001" among the speech feature data stored in the speech feature data storage unit 162 illustrated in FIG. 8. In this case, the speaker specifying unit 160 notifies the first speech recognizing unit 116 that a name of the speaker of the speech is "Yamada". If the speech recognition processing of the speech "Then, let's begin a conference" ends in the first speech recognizing unit 116, the first speech recognizing unit 116 outputs the text data as the processing result along with the time "13:12:10" and the name "Yamada" to the display processing unit 140. The display processing unit 140 displays "Then, let's begin a conference" as the authentication result at the location corresponding to "A" of the display 142 and replaces the speaker displayed as "A" with "Yamada" (refer to FIG. 9(c)). The processing for replacing the speaker displayed as "A" on the display 142 with "Yamada" and the processing for displaying "Then, let's begin a conference" to be the authentication result at the location corresponding to "A" of the display 142 may not be executed at the same time. For example, before the speech recognition result is output, the first speech recognizing unit 116 may output the name "Yamada" and the time "13:12:10" to the display processing unit 140. In this case, the display processing unit 140 may previously execute the processing for replacing the speaker displayed as "A" on the display 142 with "Yamada".

Likewise, if the speaker specifying unit 160 determines that the speaker of the speech is "Sato" from the feature of the speech "Thank you for your help" and the speaker of the speech is "Yamada" from the feature of the speech "Today's agenda is . . . ", the display processing unit 140 displays the name of each speaker as information indicating each speaker, at the same time as displaying each speech recognition result (refer to FIGS. 9(d) and 9(f)). For example, when a speaker of the group "A" makes a certain speech after the speech "Thank you for your help" of the name "Sato" is made, only "A" is displayed before the speech recognition result of the speech is displayed (refer to FIG. 9(e)). If the speech recognition result of the speech is "Before that, . . . for a little while" and the speaker of the speech is determined to be "Kobayashi" from the feature of the speech, the display processing unit 140 displays the name "Kobayashi" of the speaker as the information indicating the speaker, at the same time as displaying the speech recognition result "Before that, . . . for a little while" (refer to FIG. 9(g)).

In this embodiment, the same effect as that in the first embodiment can be obtained. According to the speech recognition processing system 100 in this embodiment, even when the speeches are input through the same first speech input unit 112, in a case where the speakers of the speeches are different, the speech recognition results can be displayed specifying each speaker in the form such that the user who confirms the speech recognition results easily views the speech recognition results without confusion.

The speech recognition processing system 100 in this embodiment can be applied to the configuration where plural judges, plural prosecutors, and plural witnesses participate in a trial in the court and a speech input unit is provided for each of the judges, the prosecutors, and the witnesses.

Each of the components of the speech recognition processing system 100 that are illustrated in the drawings illustrates a block of a functional unit, not the configuration of a hardware unit. Each of the components of the speech recognition processing system 100 may be realized by a central processing unit (CPU) of an arbitrary computer, a memory, a program implementing the components of this drawing which are loaded in the memory, a storage unit such as a hard disk to store the program, or an arbitrary combination of hardware and software using a network connecting interface. It can be understood by those skilled in the art that the implementation method and apparatus may be diversely modified.

The embodiments of the present invention have been described with reference to the drawings. However, those are presented as only examples of the invention and thus various different configurations may be adopted.

Figure 10:
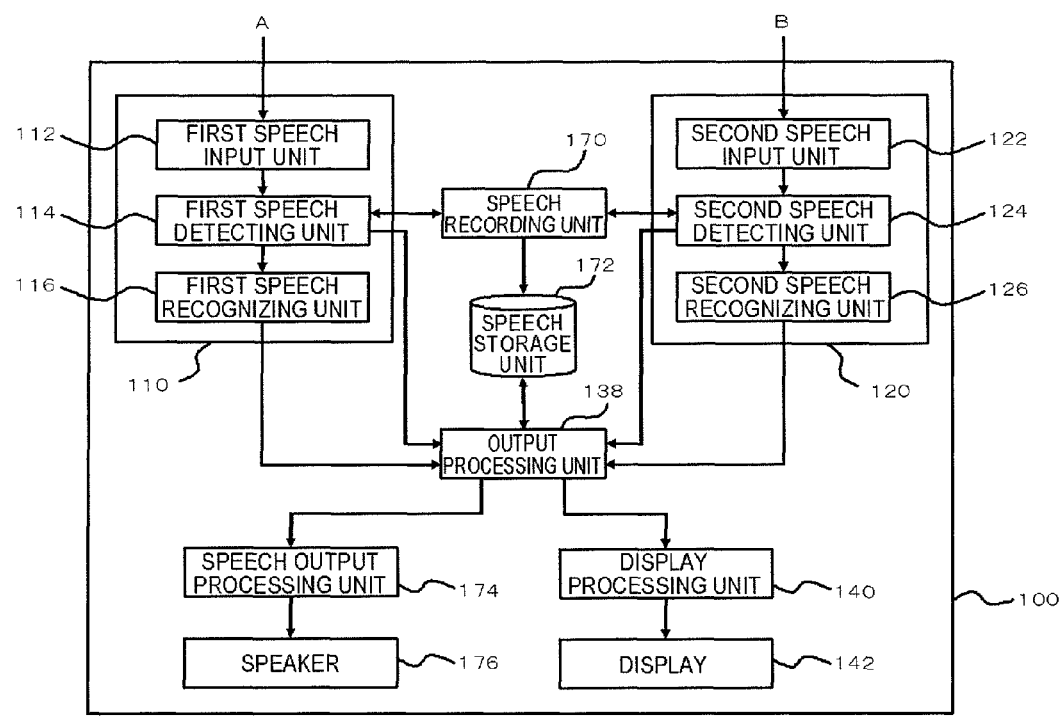
FIG. 10 is a block diagram illustrating another example of the configuration of the speech recognition processing system according to the embodiment of the present invention.

The speech recognition processing system 100 described above can have the configuration where the speech recognition result is displayed on the display 142 and the corresponding speech is output at the same time as the display. FIG. 10 illustrates an example of the configuration of the speech recognition processing system 100 to realize the above configuration. The speech recognition processing system 100 can further include an output processing unit 138, a speech recording unit 170, a speech storage unit 172, a speech output processing unit 174 (speech output processing means), and a speaker 176, as compared with the configuration of the speech recognition processing system 100 described in each of the above embodiments.

The speech storage unit 172 associates each speech with time information indicating time when the each speech is detected by the speech detecting unit and stores the association result. If the text data displayed on the display 142 is selected, the speech output processing unit 174 outputs the speech of the associated time stored in the speech storage unit 172 through the speaker 176, on the basis of the time information associated with each text data.

In the embodiments described above, the speech recognition processing system 100 includes the two speech recognition processing units. However, the speech recognition processing system 100 may include two or more speech recognition processing units.

In the embodiments described above, the first speech detecting unit 114 and the second speech detecting unit 124 associate the time information indicating the detection time of the speech with the speech data and executes the speech recognition processing. However, the speech recognition processing system 100 can have a function of adding identification information indicating the input order of the speech to the input speech, and control the information indicating the speaker of each speech and the display order of the speech recognition results according to the corresponding identification information.

In this third embodiment, the plural speakers are grouped and the first speech input unit 112 and the second speech input unit 122 are provided for each group. However, in the first embodiment or the second embodiment, the same configuration may be used. Each of the first speech input unit 112 and the second speech input unit 122 may include plural microphones and a mixer that mixes signals acquired from the plural microphones as one signal. For example, the plural microphones may be provided for each group, and the signals acquired from the plural microphones may be mixed as one signal by the mixer and may be input to the first speech detecting unit 114 or the second speech detecting unit 124.

This application claims priority based on Japanese Patent Application No. 2009-085532 filed on Mar. 31, 2009, details of which are incorporated herein by reference.

The invention claimed is:

1. A speech recognition processing system, comprising:
a first speech recognizing unit that receives a first speech as a speech of a first speaker, executes speech recognition processing on the first speech, and outputs a result of the speech recognition as first text data;
a second speech recognizing unit that receives a second speech as a speech of a second speaker, executes the speech recognition processing on the second speech, and outputs a result of the speech recognition as second text data; and
a display processing unit that displays the first text data, the second text data, a first speaker information indicating the first speaker which is associated with the first text data, and a second speaker information indicating the second speaker which is associated with the second text data in emission order of each speech on a display,
wherein the first speaker speaks the first speech before the second speaker speaks the second speech,
wherein the display processing unit outputs the first speaker information and the second speaker information in the emission order of each speech on the display before the first text data and the second text data to be associated with the first speaker information and the second speaker information are output on the display, and wherein the display processing unit outputs the first text data and the second text data on the display in order of output from the first speech recognizing unit and the second speech recognizing unit.

2. The speech recognition processing system according to claim 1, further comprising:

a first speech detecting unit that detects the first speech, sets detection time of the first speech as emission time of the first speech, associates first time information indicating the detection time of the first speech with the information indicating the first speaker, and outputs the first time information and the information indicating the first speaker to the display processing unit, before the speech recognition processing is executed by the first speech recognizing unit; and a second speech detecting unit that detects the second speech, sets detection time of the second speech as emission time of the second speech, associates second time information indicating the detection time of the second speech with the information indicating the second speaker, and outputs the second time information and the information indicating the second speaker to the display processing unit, before the speech recognition processing is executed by the second speech recognizing unit, wherein the display processing unit arranges the information indicating each speaker output from the first speech detecting unit and the second speech detecting unit in temporal order, on the basis of the time information associated with the information indicating each speaker, and displays the information on the display unit.

3. The speech recognition processing system according to claim 2, wherein the display processing unit displays the information indicating each speaker output from the first speech detecting unit and the second speech detecting unit and the time information associated with the information indicating each speaker, on the display unit.

4. The speech recognition processing system according to claim 2, wherein the first speech detecting unit outputs the first speech along with the first time information to the first speech recognizing unit, the first speech recognizing unit outputs the first text data along with the first time information to the display processing unit, the second speech detecting unit outputs the second speech along with the second time information to the second speech recognizing unit, the second speech recognizing unit outputs the second text data along with the second time information to the display processing unit, and the display processing unit associates each of the text data having identical time information with the information indicating each speaker that has been displayed on the display unit in advance and displays the association result on the display unit.

5. The speech recognition processing system according to claim 2, further comprising:

a first speech input unit that mainly receives the speech of the first speaker and outputs the received speech to the first speech detecting unit; and a second speech input unit that mainly receives the speech of the second speaker and outputs the received speech to the second speech detecting unit, wherein the first speech detecting unit detects the speech output from the first speech input unit as the first speech, and the second speech detecting unit detects the speech output from the second speech input unit as the second speech.

6. The speech recognition processing system according to claim 2, wherein the first speech detecting unit mainly detects the speech of the first speaker;

wherein the second speech detecting unit mainly detects the speech of the second speaker; and further comprising:

a volume comparing unit that compares volumes of a third speech detected by the first speech detecting unit and the second speech detecting unit respectively at the same time, and that determines that the third speech is the speech of the first speaker when the volume of the third speech detected by the first speech detecting unit is higher than the volume of the third speech detected by the second speech detecting unit, and that determines that the third speech is the speech of the second speaker when the volume of the third speech detected by the second speech detecting unit is higher than the volume of the third speech detected by the first speech detecting unit.

7. The speech recognition processing system according to claim 2, further comprising:

a speech storage unit that associates the first speech and the second speech with the first time information and the second time information, respectively, and stores the association result; and a speech output processing unit that outputs each speech corresponding to the associated time stored in the speech storage unit, on the basis of the first time information and the second time information associated with the first text data and the second text data when the first text data or the second text data displayed on the display unit are selected.

8. The speech recognition processing system according to claim 1, further comprising:

a first speech input unit that mainly receives the speech of the first speaker and outputs the speech;

a second speech input unit that mainly receives the speech of the second speaker and outputs the speech; and a volume comparing unit that compares volumes of a fourth speech simultaneously output from the first speech input unit and the second speech input unit when both the first speech input unit and the second speech input unit simultaneously output the fourth speech, and that determines that the fourth speech is the speech of the first speaker when the volume of the fourth speech output from the first speech input unit is higher than the volume of the fourth speech output from the second speech input unit, and that determines that the fourth speech is the speech of the second speaker when the volume of the fourth speech output from the second speech input unit is higher than the volume of the fourth speech output from the first speech input unit.

9. The speech recognition processing system according to claim 1, further comprising:

a speech feature data storage unit that associates speech feature data of a speech of a speaker with information indicating each speaker and stores the association result; and a speaker specifying unit that compares the first speech and the second speech with the speech feature data stored in the speech feature data storage unit, respectively and specifies the speakers of the first speech and the second speech, wherein the display unit associates the first text data and the second text data with the information indicating the first speaker specified by the speaker specifying unit and the information indicating the second speaker specified by the speaker specifying unit, respectively, and displays the association result on the display unit.

10. The speech recognizing processing system according to claim 1, wherein the second speech recognizing unit outputs the second text data before the first speech recognizing unit outputs the first text data.

11. A speech recognition processing method, comprising:

a first speech recognizing step that receives a first speech as a speech of a first speaker, executes speech recognition processing on the first speech, and outputs the speech recognition result as first text data;

a second speech recognizing step that receives a second speech as a speech of a second speaker, executes the speech recognition processing on the second speech, and outputs the speech recognition result as second text data;

a first display step that outputs a first speaker information indicating the first speaker which is associated with the first text data, and a second speaker information indicating the second speaker which is associated with the second text data in the emission order of each speech on a display before the first text data and the second text data to be associated with the first speaker information and the second speaker information are output on the display; and a second display step that outputs the first text data and the second text data on the display in order of output from the first speech recognizing unit and the second speech recognizing unit, wherein the first speaker speaks the first speech before the second speaker speaks the second speech.

12. The speech recognition processing method according to claim 11, further comprising:

a first speech detecting step that detects the first speech, sets detection time of the first speech as emission time of the first speech, associates first time information indicating the detection time of the first speech with the information indicating the first speaker, and outputs the first time information and the information indicating the first speaker before speech recognition processing is executed in the first speech recognizing step; and a second speech detecting step that detects the second speech, sets detection time of the second speech as emission time of the second speech, associates second time information indicating the detection time of the second speech with the information indicating the second speaker, and outputs the second time information and the information indicating the second speaker before the speech recognition processing is executed in the second speech recognizing step, wherein the first display step arranges the information indicating each speaker output from the first speech detecting step and the second speech detecting step in temporal order and displays the information on the display unit, on the basis of the time information associated with the information indicating each speaker.

13. A non-transitory medium storing a speech recognition processing program that causes a computer to function as:

a first speech recognizing unit that receives a first speech as a speech of a first speaker, executes speech recognition processing on the first speech, and outputs the speech recognition result as first text data;

a second speech recognizing unit that receives a second speech as a speech of a second speaker, executes the speech recognition processing on the second speech, and outputs the speech recognition result as second text data; and a display processing unit that displays the first text data, the second text data, a first speaker information indicating the first speaker which is associated with the first text data, and a second speaker information indicating the second speaker which is associated with the second text data in emission order of each speech on a display, wherein the first speaker speaks the first speech before the second speaker speaks the second speech, wherein the display processing unit outputs the first speaker information and the second speaker information in the emission order of each speech on the display before the first text data and the second text data to be associated with the first speaker information and the second speaker information are output on the display, and wherein the display processing unit outputs the first text data and the second text data on the display in order of output from the first speech recognizing unit and the second speech recognizing unit.

14. A non-transitory medium storing the speech recognition processing program according to claim 13, wherein the speech recognition processing program causes the computer to further function as:

a first speech detecting unit that detects the first speech, sets detection time of the first speech as emission time of the first speech, associates first time information indicating the detection time of the first speech with the information indicating the first speaker, and outputs the first time information and the information indicating the first speaker to the display processing unit, before the speech recognition processing is executed by the first speech recognizing unit; and a second speech detecting unit that detects the second speech, sets detection time of the second speech as emission time of the second speech, associates second time information indicating the detection time of the second speech with the information indicating the second speaker, and outputs the second time information and the information indicating the second speaker to the display processing unit, before the speech recognition processing is executed by the second speech recognizing unit, wherein the display processing unit arranges the information indicating each speaker output from the first speech detecting unit and the second speech detecting unit in temporal order and displays the information on the display unit, on the basis of the time information associated with the information indicating each speaker.

* * * * *